UNITED STATES PATENT OFFICE.

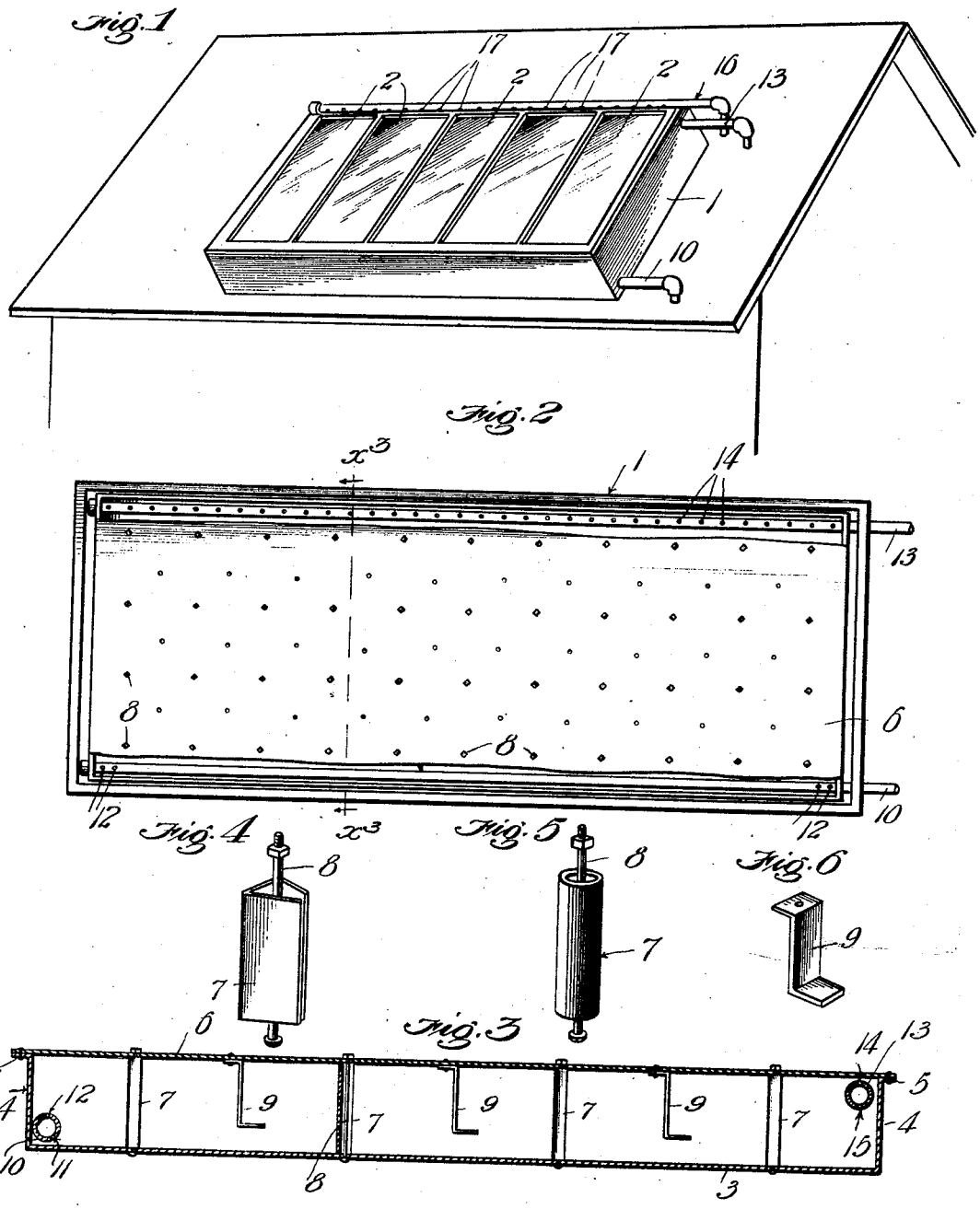

CHARLES L. HASKELL, OF BOSTON, MASSACHUSETTS.

SOLAR HEATER.

No. 842,658.　　　Specification of Letters Patent.　　　Patented Jan. 29, 1907.

Application filed June 28, 1904. Serial No. 214,456.

*To all whom it may concern:*

Be it known that I, CHARLES L. HASKELL, a citizen of the United States, residing at Boston, in the county of Suffolk and State of Massachusetts, have invented a new and useful Solar Heater, of which the following is a specification.

This invention relates to improvements in solar water-heaters; and the object of the invention is to heat the water more quickly than by apparatuses now employed. This is attained by providing a novel construction and arrangement in which the cold water is fed into the tank at many points in small streams and uniformly distributed in the tank, and after passing through the tank and being heated it percolates at numerous points through small orifices into a discharge-pipe from which the hot water may be drawn for use. The water being fed in numerous small segregated streams and thoroughly diffused in the tank is much more quickly heated than where water is introduced in a body in one relatively large stream. By this method of introducing the water and discharging the water short-circuiting of currents is avoided, and the water in its passage through the tank is so spread out and diffused that it receives the greatest amount of heat, which gives a much greater efficiency than where the cold water enters in a body and the larger bulk of it has to be heated by conduction.

A further object is to provide means for securing an increased conduction of heat to the water within the tank, whereby the water comes into intimate contact with novelly-constructed devices which are good conductors of heat and which serve to impart their heat to the water as it circulates by the devices. I also provide for quickly obtaining a supply of hot water by drawing off the water from an extended corner of the tank where the water is hottest.

The invention comprises a flat tank having a sharp extended corner in its uppermost part, an inlet-pipe extending along one edge and an outlet-pipe extending along the opposite edge, both of said pipes having perforations for passage of water into and out of the tank and having its perforations opening into its top from said uppermost corner, and the inlet-pipe being at a lower level and having its perforations opening into the tank from the bottom of the inlet-pipe, the pipes and perforations having such relative dimensions as to cause the water to flow substantially evenly throughout the length of the tank from the inlet-pipe to the outlet-pipe and to take the water from the uppermost corner of the tank, whereby the outflowing water is always drawn from the hottest part of the tank.

The accompanying drawings illustrate the invention, and, referring thereto, Figure 1 is a perspective view of the apparatus, showing it in position on a roof. Fig. 2 is a plan view of the apparatus with the transparent cover removed and a portion of the top of the heating-chamber being broken away to disclose the inlet and outlet pipes. Fig. 3 is an enlarged cross-section on line $X^3 X^3$, Fig. 2. Fig. 4 is a perspective in detail, showing one form of the radiating-support. Fig. 5 is a detail perspective showing another form of radiating-support. Fig. 6 is a perspective in detail, showing a wing-radiator.

The apparatus comprises a box or housing 1, which may be either partially or wholly transparent. In the present embodiment I have shown the top of the box 1 as having several transparent panels 2, formed of glass or other suitable material. The box 1 is arranged in an inclined position on the roof, either on top of the roof, as shown, or it may be sunk below the roof or arranged in any other desired manner. Within the box 1 is a tank, preferably flat, comprising a bottom 3, having side walls 4, the upper rim of which is provided with flanges 5, and a top 6 is attached to the flanges 5 and closes the tank.

In order to support the top 6 and also to provide for conduction of heat from the top through the tank, a series of struts 7 are provided, and tie-bolts 8 pass through the struts and through the top and bottom plates and hold the parts of the tank together. These struts 7 may be formed in various ways. A very simple and economical construction is illustrated in Fig. 4, in which the strut comprises a piece of sheet metal bent into a triangular trough shape, the tie-bolt 8 being shown in the position which it has passing through the center of the strut. By leaving the strut open along one side or edge the water of the tank can have access to the inner surface as well as to the exterior and also to the bolt, thereby increasing the radiating surface of each fastener without materially obstructing the flow of the water from the bottom to the top of the tank. This construction also facilitates assembling the parts, as the strut can be slipped over the tie-bolt from the side. Fig. 5 shows another form of strut comprising a tube which may comprise a section of pipe.

The tank is preferably painted black, so as to absorb as much heat as possible, and in order to conduct heat from the top to the water within the tank a series of radiating-wings 9 are employed, which in the present embodiment are shown Z-shaped, one foot of the radiator being riveted to the top plate 6, as shown. The wing-radiators may extend into the tank about the distance shown. The radiators are preferably flat and arranged with their flat sides across a stream of water flowing through the tank from the inlet-pipe to the outlet-pipe. The flat construction of the wings gives an extended surface at the upper end of each where it is bolted against the under surface of the top, thereby enabling it to absorb as much heat as possible, and such flat construction of the wings also increases the transmission of heat to the water by reason of the fact that the water on striking the wings is deflected thereby, and thus brought into more effective contact therewith. These wings terminate above the bottom of the tank so as to leave a free space for passage of the water. The extensions at the lower ends of the wings projecting longitudinally in a direction of the current give an increased conducting effect without increase of resistance to the passage of the water. It will be noted on reference to Fig. 2 that these wings are located alternately with the supporting-struts as regards transverse position—that is to say, in the longitudinal direction of the box the transverse series of struts is followed by a transverse series of wings extending in planes between the planes of the respective struts, and the following transverse sets of struts again alternates with the wings, and so on—so that the stream or current of water as it passes each transverse set of struts is deflected toward the succeeding radiator-wing and as it passes each set of radiator-wings it is deflected toward the next succeeding set of struts, the current being thus continually concentrated on the heat-imparting devices.

Cold water is fed into the tank by a supply-pipe, which, as shown in Fig. 1, is arranged, preferably, at the extreme lower part of the tank, and the end of the pipe 10 extends through the tank and box, as shown. The pipe 10 is provided along the under side with a series of perforations 11, through which the cold water percolates into the tank. The pipe is also provided on its upper side with a few small air-vents 12, as shown.

Arranged, preferably, at the extreme upper end of the tank or at the diagonally opposite side thereof, as shown in Fig. 1, is a discharge-pipe 13, the upper wall of which is provided with a series of perforations 14, through which the heated water passes into the pipe from the tank. The under side of the pipe 13 is also provided with a few small air-vents 15, pipes 10 and 13 being similar in construction except that the lower pipe 10 has its distributing-perforations arranged on the bottom, while the pipe 13 has its receiving-perforations arranged on top. This secures the best circulation of the water from one pipe to the other.

The cold water is fed into the pipe 10 and is split into numerous small streams by the perforations 11, and the small streams issuing from the perforations 11 work their way through the tank and diffuse throughout the tank. The water within the tank receives heat directly from the sun and also by conduction through the water and through the radiating-wings 9 and struts 7, a much greater amount of heat obviously being conducted by the wings and struts than is accomplished through the water itself, and the water after circulating through the tank percolates through the perforations 14 into the pipe 13, from which it may be drawn as needed. It is obvious that if the water passed from the pipe 10 or into the pipe 13 at one point the water would tend to short-circuit within the tank, and it would not be diffused so thoroughly as when it can flow from the pipe 12 or enter the pipe 13 only by the perforations 11 and 14, respectively, which are distributed so as to embrace the entire length of the tank, and by locating the perforations 14 in the top of the pipe 13 and adjacent to the top of the tank the hottest portion of the water is compelled to enter the pipe 13 in a thin sheet extending from one end of the box to the other, which also causes the entrance of the water uniformly from the holes 11 in the pipe 10.

In order to clean the transparent top part of the box, a pipe 16 is provided outside of the box at the upper edge, as shown in Fig. 1, and the pipe 16 has numerous small perforations 17 along its length, so that by admitting water to the pipe 16 it will percolate through the perforations 17 and spread out in a film over the top of the box and wash the same free from dust or other things which would cloud the tank and tend to shield the water from the sun's rays.

What I claim is—

1. In a solar heater, a tank, an outlet and an inlet pipe arranged diagonally opposite each other on opposite sides of the tank, said pipes being each perforated, and wings secured to the under surface of the top and extending down in position to engage with a stream of water passing from the inlet to the outlet pipe, said wings extending from the top toward the bottom but terminating above the bottom so as to leave a free space for passage of liquid below the same.

2. In a solar heater, a tank, the top of which is flat upon its under surface, an inlet and an outlet pipe arranged diagonally opposite each other on opposite sides of the tank, said pipes being each perforated its entire length, and flat wings extending down into the tank in position to engage flatwise with a stream of water passing from the inlet to the outlet pipes said wings extending from the top of the tank part way to the bottom and terminating above the bottom in longitudinally-extending wings projecting in the direction of the flow or stream of water passing from the inlet to the outlet pipes, and means for holding the top in its flat position.

3. In a solar heater; a tank, inlet and outlet pipes arranged at opposite ends of the tank, combined ties and struts extending in series of transverse rows across the tank and wings extending from the top of the tank in a series of transverse rows alternating in transverse position with the series of rows of struts so that each series of struts will deflect the stream against the next succeeding series of wings and each series of wings will deflect the stream against the next succeeding series of struts.

4. In a solar heater, a flat tank provided with perforated inlet and outlet pipes arranged on opposite sides thereof, hollow struts extending from the top to the bottom of the tank, said struts being triangular in cross-section and open along one edge, and bolts extending longitudinally through the struts and through the top and bottom respectively, of the tank.

In testimony whereof I have hereunto set my hand, at Los Angeles, California, this 21st day of June, 1904.

CHARLES L. HASKELL.

In presence of—
 GEORGE T. HACKLEY,
 TILLIE E. ADAM.